Aug. 8, 1944.   R. E. DUNHAM   2,355,519
CULTIVATOR
Filed Aug. 7, 1940   3 Sheets-Sheet 1

INVENTOR.
Ray E. Dunham
BY
HIS ATTORNEY.

Aug. 8, 1944.    R. E. DUNHAM    2,355,519
CULTIVATOR
Filed Aug. 7, 1940    3 Sheets-Sheet 2
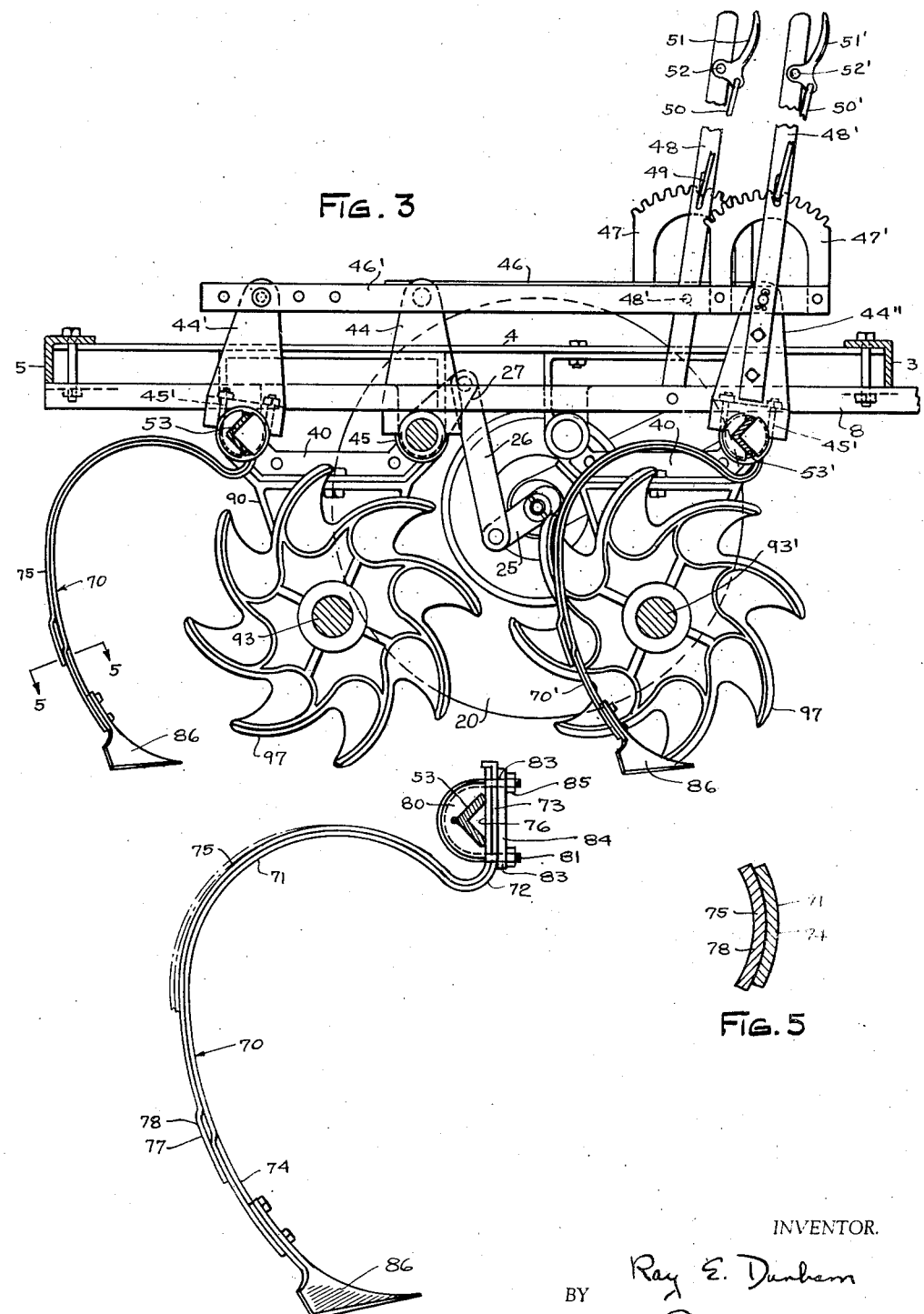

Aug. 8, 1944.　　　R. E. DUNHAM　　　2,355,519
CULTIVATOR
Filed Aug. 7, 1940　　　3 Sheets-Sheet 3

INVENTOR.
Ray E. Dunham
BY
Frank M. Slough
ATTORNEY.

Patented Aug. 8, 1944

2,355,519

UNITED STATES PATENT OFFICE 2,355,519

CULTIVATOR

Ray E. Dunham, Berea, Ohio, assignor to The Dunham Company, Berea, Ohio, a corporation of Ohio Application August 7, 1940, Serial No. 351,688

5 Claims. (Cl. 97—8)

This invention relates to agricultural implements of the power driven type for cultivating and pulverizing the soil.

Heretofore cultivators have been constructed having gangs of so-called hoe wheels of the type shown in Letters Patent No. 1,911,623, granted to G. E. Karl, May 30, 1933, having tooth wheels mounted to roll along the ground and to work the soil when the teeth thereof are successively forced into and retracted from the soil. Other agricultural implements have been constructed of the type shown in Letters Patent No. 2,037,621, granted to R. E. Dunham April 14, 1936, having resilient spring teeth which are thrust into the soil to pulverize the soil. These are sometimes used in connection with gangs of discs to plow and turn the soil.

Since the soil is hard and compact when cultivators of the type employing hoe wheels are rolled over it, the normal weight of the hoe wheels is insufficient to force the teeth of the hoe wheels into the ground. When spring teeth alone are employed for pulverizing and for seeding, there is a tendency of the teeth to suck or bury the teeth into the earth. A further problem is caused by the lack of weight in a spring tooth construction resulting in bouncing of the tooth which is further accentuated by lack of uniformity, in the density of the earth.

It is among the objects of this invention to provide a combined cultivator and pulverizer wherein the action of the cultivator means is counterbalanced by the action of the pulverizer means and undesirable features of one or the other are overcome.

Another object of my invention is to provide an agricultural implement which is susceptible of a number of adjustments as to depth or penetration of the soil working means employed therein.

Another object of my invention is to provide improved means in an agricultural implement of the class described for throwing the soil to one side or the other of the soil working tool.

Another object of my invention is to provide an improved agricultural implement of the class described which will be economical to construct, simple in operation and subject to alternative use.

Other objects of my invention and the invention itself will become increasingly apparent from a consideration of the following description and drawings wherein:

Fig. 3 is a vertical sectional view taken on a line 3—3 of Fig. 1;

Fig. 4 is a sectional detail view taken on a line 4—4 of Fig. 1;

Fig. 5 is a sectional view taken on a line 5—5 of Fig. 3;

Figure 2:
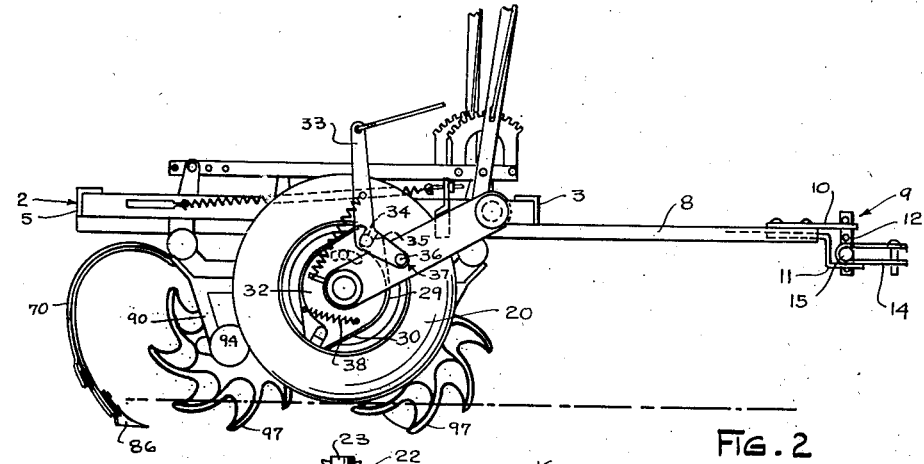
Fig. 2 is a side elevational view of the implement shown in Fig. 1.
Figure 1:
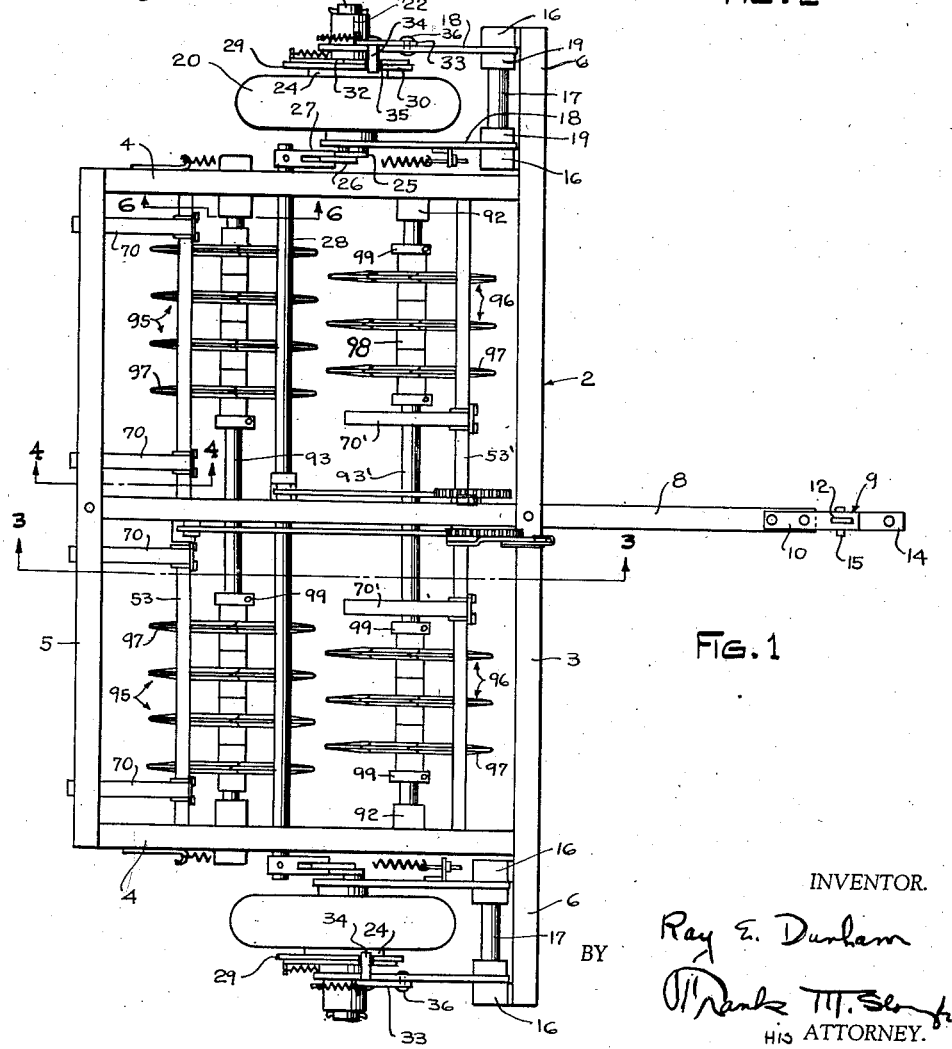
Fig. 1 is a top plan view of an agricultural implement embodying the invention.

Referring to the drawings, a frame 2 of generally rectangular form comprises a front frame member 3, a pair of side frame members 4—4 and a rear frame member 5 preferably consisting of suitable lengths of angle stock. The extremities of member 5 are secured to an extremity of each of members 4—4, while the other extremities of members 4—4 are secured to member 3 inwardly of its extremities to provide projecting portions 6—6.

Intermediate the ends of members 3 and 5 and preferably centrally thereof, is a tongue member 8 which extends from member 5 to a point beyond and forwardly of the member 3, at which point a connector or hitch 9 is secured. The hitch 9 comprises a pair of spaced strap members 10 and 11 between which a link 12 is removably secured. A U-strap 14 is pivotally connected to link 12 by a pin or bolt 15 so that the free ends of strap 14 may be hingedly connected to a suitable draft means.

Although any other suitable tongue and hitch arrangement may be utilized, the tongue 8, being of channel cross section, also serves to strengthen the frame structure, as well as to provide a support for mechanism hereinafter described.

The portion 6 of front frame member 3 serves to support a pair of spaced bearing brackets 16—16 between which a stub shaft 17 extends to pivotally support arms 18—18. Each arm 18—18 is held adjacent one of the brackets 16—16 by means such as collars 19—19, which may, if desired, be integral with arms 18—18 and secured to shaft 17 in a convenient manner, preferably so that arms 18—18 may be moved in unison. Arms 18—18 normally extend downwardly and rearwardly and support therebetween a transport wheel 20 which is adjustable to determine the height of frame 2 from the ground in a manner now to be described. The other portion 6 of the member 3 supports a similar wheel 20 in a similar manner.

The lower ends of arms 18—18 are provided with bearings 22—22 which support an axle 23 which projects through a hub 24 of the wheel 20. Connected eccentrically to the axle 23 by a link 25 is a crank arm 26 connected to a split arm 27 in turn rigidly secured to a transverse shaft 28. The wheel and hub normally are free to rotate on axle 23. Embracing the hub 24 is a drum 29 fixed to the axle and provided with a cam surface 30. Pivoted on the drum 29, as at 31, is a pawl member 32, to which is secured a roller (not shown) capable of engaging teeth (not shown) on the hub 24. The roller is normally held out of engagement with the teeth by means of a lever 33 of generally L-shape carrying a roller 34 normally received in a slot 35 in an end of the cam 30. The lever 33 is rockable about a pivot portion 36 secured to an arm 18 as at 37. Any suitable means may be employed to rock the lever 33, such as a rope or other pulling means, to disengage the roller from the slot 35. Such disengagement permits the pawl 32 to rock under the influence of a spring 38 to thereby engage the roller (not shown) with a tooth on the hub and thereby connect the wheel 20 to the axle 23.

Depending from the side frame members 4—4 are two pair of primary brackets 40—40 bolted in forwardly and rearwardly spaced relation to the frame members. Brackets 40—40 are of generally rectangular form preferably having inwardly flanged portions 41, and integrally formed bearing sleeves 42—42. The shaft 28 is journalled in one pair of aligned sleeves 42 of one pair of oppositely disposed brackets 40—40, and is adapted to be oscillatably rotated therein for a purpose to be described, but is preferably prevented from axial shifting by any suitable means.

Intermediate the ends of the shaft 28 is an arm 44 rigidly secured to the shaft by means of a U-bolt 45. Projecting generally horizontally from and pivotally connected to the arm 44 is a bar 46 to the forward extremity of which is bolted a rack 47. An operating lever 48 is pivoted at its lower end to the tongue 8 adjacent the front frame member 3, and pivotally supports the rack end of the bar 46 as at 48. The lever is provided with a pawl 49, which cooperates with the teeth of the rack 47, and is operated through the medium of a rod 50, connected to a grip member 51 pivoted adjacent the top of the lever 48, as at 52.

By operating the grip member 51, the pawl 49 may be retracted from the teeth of the rack 47 and the lever 48 rocked to correspondingly rock the shaft 28 and thereby cause relative movement between the frame 2 and wheels 20 through the mechanism above described.

Figure 6:
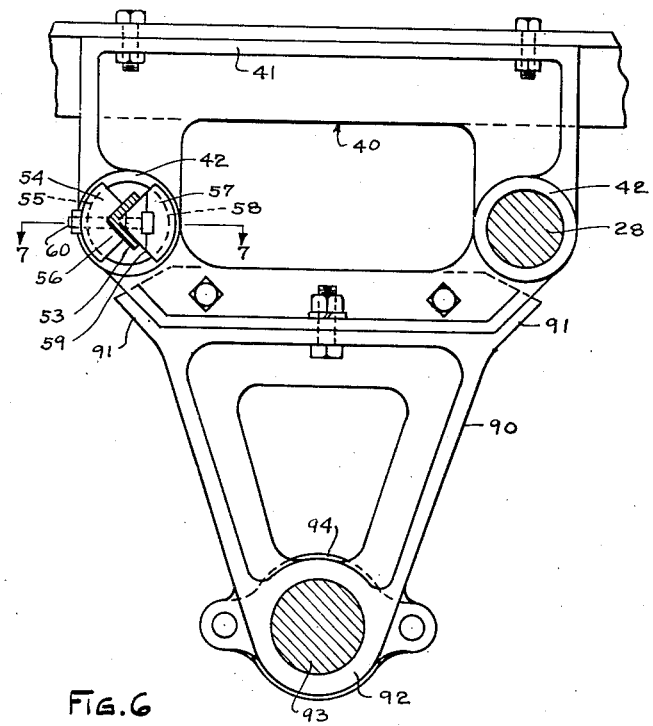
Fig. 6 is a sectional view taken on a line 6—6 of Fig. 1.
Figure 7:
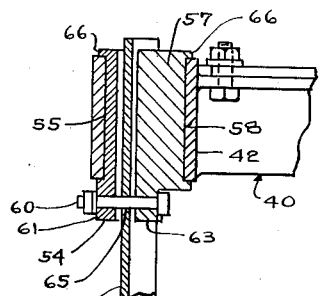
Fig. 7 is a fragmentary sectional view taken on a line 7—7 of Fig. 6.

In another pair of aligned sleeves 42 of the oppositely disposed brackets 40—40 is journalled a transverse bar 53 of angular cross section. As particularly shown in Figs. 6 and 7, a split journal is provided for the ends of the bar 53, which comprises a bearing sector 54 having an arcuate sleeve engaging outer surface 55 and a longitudinally extending inner groove 56 of a generally V-shape engageable with the outer surfaces of the angle bar 53, and a bearing sector 57 having an arcuate sleeve engaging outer surface 58 and converging plane surface 59 engageable with the inner surfaces of the bar 53, and a connecting element, such as the bolt 60 for securing the sectors to the bar.

The sector 54 is preferably enlarged, as at 61, and the sector 57 is formed with a projection 63, each provided with an aperture for receiving the bolt 60. The bar 53 is also provided with an opening, as at 65. Thus, by assembling elements 53, 54, and 57 in the relation shown in Fig. 7, so that bolt-receiving openings are in register, the bolt 60 may be projected therethrough to secure the journal together and to the bar 53. The bar is thus oscillatably mounted, and may be prevented from axial movement in the bearing sleeves 42 by means of flanges 66 formed on the opposite ends of the sections 54 and 57.

Suitably spaced on the bar 53 are a plurality of spring teeth, indicated generally at 70. With particular reference to Fig. 4, spring teeth 70 comprise an irregularly curved resilient element or leaf spring 71 bent partially back upon itself as at 72 to provide a mounting portion 73, and a lower concavo-convex end portion 74.

A similar bar 53' is similarly mounted in the other brackets 40—40 and supports a plurality of spring teeth 70' in a manner hereinafter described in connection with the teeth 70.

A second leaf spring 75 has a mounting portion 76 in close proximity to the portion 73, and a corresponding curvature throughout a major portion of the length of leaf 71, but terminates short of the lower end of the leaf 71, as at 77, and is formed with a concavo-convex portion 78 engageable with the similar portion 74. The leaf springs 71 and 75 are mounted on the bar 53 for vertical and longitudinal adjustment with respect thereto by means of a sector 80, similar in most respects to the sector 54 previously described, which is held in engagement with the bar 53 by U-bolts 81 embracing the edges of the springs 71 and 75, and project through openings 83—83 in a clamping bar 84 interposed between spring leaf portion 73 and nuts 85—85 threaded onto the ends of bolts 81. Thus, the bar 53 is gripped between the sector 80 and the mounting portion 76 of leaf 75 to removably secure the teeth 70 in their desired position.

Figure 8:
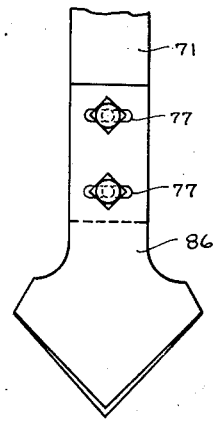
Fig. 8 is a fragmentary front view of a spring tooth illustrating the method of securing a shovel thereto.

Removably secured to the concavo-convex end portion 74 of leaf 71, are shovels or sweeps 86. The sweeps 86 may be of a number of different shapes dependent upon the work required of them, and are preferably bolted to the ends of the leaf springs 71, a pair of horizontal slots 77 being provided in each leaf, as shown in Fig. 8, to permit adjustment of the sweeps on the spring members.

Arms 44' and 44'' are rigidly secured to the bars 53 and 53' respectively, by U-bolts 45'. The upper ends of the arms are interconnected by means of a generally horizontal bar 46' which carries a rack 47' at one end thereof. A lever 48' and associated mechanism similar to that described in connection with lever 48 is provided. In this instance, however, the lever 48' is connected to the arm 44''. Thus, manipulation of the lever 48' rocks the bars 53 and 53' in unison to determine the working depth of the sweeps 86 on the ends of spring teeth 70 and 70'. A plurality of apertures are provided in the bar 46' so that the effective length of the bar, and therefore angularity of the arm 44' with respect thereto, may be varied. Thus, the teeth 70 and 70' may be adjusted to different working depths as well as to the same depth, as desired.

The use of these sweeps has heretofore been objectionable due to their tendency to suck or bury themselves into the earth, and to "bounce," caused by lack of weight in construction of the apparatus, and construction of the spring teeth, per se. The spring teeth here provided overcome these objections due to their double spring leaf form, which tends to strengthen their working action and improve their vibratory re-action. This is effected by the non-symmetric curvatures and the sliding contact provided between the lower ends of the leaves; enabling the sweep to be vibrated a limited amount and at the same time reenforcing the sweep carrying leaf so that rearward movement thereof is resiliently checked and stopped to prevent undue sucking, as well as bouncing.

Depending from the primary brackets 40—40 are secondary brackets 90—90, preferably bolted thereto. Brackets 90—90 are formed with upwardly extending flanges 91—91 to engage brackets 40—40 so that turning movement therebetween is prevented. At the lower extremities of brackets 90—90 are integrally formed bearing sleeves 92—92 arranged with their bores in axial alignment to receive the ends of transverse shafts 93 and 93'. Axial displacement of shafts 93 and 93' is prevented by means of caps 94 secured to the ends of the shafts.

Suitably mounted on shaft 93 are two gangs 95—95 of rotary wheel hoes 97, four hoes to the gang; and on shaft 93' are two gangs 96—96, having three hoes to the gang. The hoes 97 are provided with hub portions 98 which are received on the shafts and serve to space the hoes with respect to each other. Axial displacement of hoes 97 on the shafts is prevented by means of collars 99 secured to the shafts at the outer ends of each gang of hoes. The hoes of gangs 96—96 are preferably arranged to rotate in planes intermediate the planes of the hoes in gangs 95—95.

In the operation of the above described cultivator, the gangs of wheel hoes 95 and 96 are adjusted along the shafts 93 and 93' in accordance with the width of the crop row to be cultivated, so that the center of the gangs may run directly on or in the row. And the sweeps 86—86 are positioned by adjusting the attachment of the teeth 70 and 70' longitudinally along the bars 53 and 53' so that they may work between two adjacent rows at a spaced distance from the row, and vertically of the bars to determine their working depth.

The cultivator is then drawn along the crop row, the teeth of the wheel hoes cultivating the soil in and adjacent to the row and the cultivator sweeps 86 working the soil between the rods. The entire surface of the soil is thus cultivated and the soil is not only mulched but all weeds are killed. In this connection, it will be understood that the final going over of the soil before planting will kill or retard any weeds which may have sprouted. The crop therefore will get a start ahead of the weeds so that if the crop, after it sprouts, is cultivated as above described, the later sprouting weeds, being more tender and easily destroyed, will be eradicated and from that time on at successive workings with the above described cultivator, the weeds may be successfully kept down until the crop can be laid by.

The action of the wheel hoes for this purpose is well known and in general the action of spring cultivator teeth or spring teeth with sweeps of some form thereon in working soil is well known. However, cultivator teeth when used in a machine as above described, particularly when adjustable as to depth in the ground, as above described, perform a function which insofar as I am aware is entirely new, and which will now be explained.

Wheel hoes, when used in gangs, tend to run on the surface of the soil and not to penetrate into it. This, of course, is because there are many wheel hoes usually in a machine and the part of the total weight supported by each hoe is small and not sufficient to cause the teeth to penetrate the soil. Resort therefore has heretofore been made to weight as the only means for forcing the teeth of the hoes into the ground and if other forms of cultivator teeth have been used concurrently with the hoes, their sole function has been that of cultivating the soil.

In the above described machine, cultivator teeth 86 are chosen not only for cultivating purposes but for suction purposes. Cultivator teeth of various forms such as tongues, sweeps, shovels, etc., when set at a suitable angle with the ground tend to go deeper and deeper into the ground as they are propelled through it, this action being referred to as suction. Where, therefore, the teeth 86 of the above described cultivator are projected into the soil, this downward thrust or suction is transmitted to the entire frame and pulls the teeth of the wheel hoes into the soil. If the soil is hard the cultivator teeth will be projected farther thereinto to exert greater suction, and vice versa if the soil is soft. Thus, in the operation of this cultivator, the cultivator teeth 86 will be set at a depth which will produce the desired suction on the wheel hoes regardless of the most suitable depth for these teeth as cultivating teeth.

For example, if the soil is hard, the teeth 86 will be projected into the soil considerably farther than the ideal depth to which they would be set on an ordinary cultivator since the primary function of the teeth 86 is to pull the wheel hoe teeth into the soil and the secondary function thereof is to cultivate or break up the soil.

The result is that a machine may be made of such light weight that with the necessary number of wheel hoes to cultivate two rows at a time, the teeth of the hoes would, in most cases, simply roll along on the soil substantially without working the same, but all well known advantages of light weight and cheap construction may be enjoyed with wheel hoes by the above described means whereby even with an extremely light weight apparatus, the wheel hoe teeth may be caused to work the soil at any desired depth.

Furthermore, the reverse action is also true, namely, that the wheel hoes tend to prevent the spring supported sweeps from "sucking" to an abnormal degree. Thus, the action of the wheel hoes and sweeps compensate for the action of each other to provide the desired combined action. In addition, the wheel hoes serve as rotary shields, because of their location with respect to the spring teeth, to prevent covering the crop with soil thrown up by the action of the sweeps on the spring teeth.

Thus in building such a machine, only enough material need be put thereinto to give it the necessary strength and the lack of weight which normally follows, and which would render the prior wheel hoe cultivators inoperative, for the reasons given, is compensated for by the adjustable function of the cultivator teeth 86. Accordingly, means are provided to increase the effective weight of the machine without adding any dead weight thereto.

And the further advantage results that the function of the cultivator teeth can be instantly varied as the hardness of the soil encountered in different parts of a field varies, to keep the wheel hoes always working at the maximum depth in the soil, which instantaneous and convenient variation of wheel hoe working depth cannot be performed in a practical manner when weight alone is relied on to hold the wheel hoe teeth in the soil. It will be observed therefore that the wheel hoe teeth may be kept at the optimum depth in the soil by moving the lever 48' back and forth in accordance with the hardness variation of the soil and likewise, the working depth of the wheel hoes, in general, may be varied, so that at one working of the crop, the teeth may be worked shallow and at another working may be worked to a greater depth, all by suitably positioning the lever 48' by the operator of the machine.

In addition, a convertible implement has been provided, wherein the gangs of wheel hoes, together with their shafts 93 and 93' as well as secondary brackets 90—90, may be easily removed from the machine, and additional spring teeth 70 and 70' added to form a conventional spring tooth cultivator. Likewise, all of the spring teeth may be readily removed, to provide a machine with gangs of hoe wheels only, to form a conventional rotary hoe.

When it is desired to lift one or both ends of the frame for any reason as, for example, when turning at the end of a crop row, lever 33 is rocked forwardly to connect the wheel 20 to the axle, which together with linkage 25, 26, and 27, causes relative movement between the frame and wheel, as hereinbefore described.

It will be apparent, therefore, that my invention involves more than merely combining wheel hoes with cultivator teeth in a single machine, because by means of the arrangement and organization of the parts, results are obtained as not obtained with prior machines of this class of which I am aware, not the least of which is that the wheel hoes can be made to run in the soil at a pre-selected depth and maintained at that depth throughout wide variations of hardness of the soil encountered. The flexibility of adjustment of the machine described permits it to be used to cultivate crops of a wide range of row width.

It is to be observed that if spring teeth alone or standards with narrow teeth are utilized, it would not be praticable to use a sufficient number to provide the necessary suction. Such teeth would have to be placed so close together that they would collect trash in the operation of the machine. I have found that it is not desirable to place such teeth or such springs or standards closer together than ten inches to prevent the collection of trash but that even at this spaced distance, if shovels or teeth of considerable breadth at the end opposite the point thereof are used, all the necessary suction will be developed so that, as will now be apparent, in this respect also, a new mode of operation for the teeth results.

No matter how great the suction developed in this manner, no harm can come to the crop row because the shovels, teeth, or the like, used, work the soil between the rows and at spaced distance from the plants.

It is to be understood that any power propelling mechanism may be used to push or pull the cultivator of my invention and that various other departures in the exact form shown herein may be made without, however, departing from the spirit of my invention and the subject matter of the appended claims.

What I claim is:

1. A cultivator comprising a frame adapted to be propelled along the ground, a rock shaft mounted on the frame, a plurality of spring teeth comprising leaf springs of double spring form, one of said leaf spring members being irregularly curved and said second leaf spring member having a corresponding curvature throughout a major portion of its length, said second spring member being relatively shorter than said first named spring member, each spring member being provided with concavo-convex end portions and having sliding contact with each other, the first said leaf spring having a sweep secured to its concavo-convex end portion, said sweep being adapted to vibrate a limited amount, said spring teeth being adjustably secured in spaced relation longitudinally of said shaft, means to rock said shaft to project the said teeth into the soil to a predetermined normal depth, and rotary means on said frame in such spaced relation to said spring teeth as to work concurrently the soil between said teeth when said cultivator is being propelled along the ground, said rotary means operating upon the surface of the soil and assisting said spring members in limiting abnormal projection of said teeth into the soil.

2. A cultivator comprising a frame adapted to be propelled along the ground, a plurality of spring teeth mounted on said frame, each of said spring teeth being mounted on said frame by spring means to which they are secured, said spring means being so formed as to resiliently check rearward movement of said teeth, said teeth being adapted to work the soil at a normal working depth therein, and rotary means mounted on said frame in spaced relation to said spring teeth for assisting in maintaining said spring teeth substantially at their normal working depth irrespective of soil density, said rotary means adapted to work the soil when the cultivator is being propelled along the ground concurrently with the operation of said spring teeth.

3. In a cultivator, a frame, a transverse shaft on the frame, a plurality of wheel hoes rotatable on the said shaft and axially adjustably shiftable therealong to position them, means to hold them against axial shifting when adjusted, a plurality of spring teeth having supports adjustably positionable axially along a bar and adapted to be secured to the said bar in adjusted positions, said positions being interposed between groups of said wheel hoes, and lever means to rock the bar to project the teeth into the soil or withdraw them therefrom.

4. A cultivator comprising a frame having forwardly and rearwardly extending frame members, a front and a rear rock bar on the frame members, lever means to adjustably rock the shafts and secure them in rocked relation, a plurality of groups of wheel hoes rotatable on transverse shafts mounted on the frame, said wheel hoes adjustably shiftable between the frame members to position the said hoes on the said shafts, means to secure the hoes thereon, a plurality of spring teeth, supports therefor adapted to be adjustably moved along the rock bars and secured thereto in adjusted relation, suction type sweeps on the spring teeth adapted to be projected into and withdrawn from the soil upon rocking of the rock bars.

5. In a cultivator having a frame adapted to be moved along the ground, ground working tools mounted on the frame for working the soil, lever means associated with said ground working tools by which the working depth of said tools may be adjusted, and means comprising other ground working tools positioned in spaced relation to said first named ground working tools as to be concurrently operative upon the soil, said tools being of the soil surface working type and compensating for pull on the frame tending to force said first tools into the soil beyond their adjusted working depth.

RAY E. DUNHAM.